United States Patent
Chen

(10) Patent No.: US 9,437,960 B2
(45) Date of Patent: Sep. 6, 2016

(54) DUSTPROOF COVER FOR CHARGING PORT OF ELECTRONIC DEVICE AND CHARGING BASE CORRESPONDING TO DUSTPROOF COVER

(71) Applicant: Youhua Technology (Shenzhen) Co., Ltd, Shenzhen (CN)

(72) Inventor: Shichong Chen, Shenzhen (CN)

(73) Assignee: YOUHUA TECHNOLOGY (SHENZHEN) CO., LTD (CN)

( * ) Notice: Subject to any disclaimer, the term of this patent is extended or adjusted under 35 U.S.C. 154(b) by 419 days.

(21) Appl. No.: 14/133,812

(22) Filed: Dec. 19, 2013

(65) Prior Publication Data

US 2015/0180160 A1    Jun. 25, 2015

(51) Int. Cl.
H01R 13/52 (2006.01)
H02J 7/00 (2006.01)

(52) U.S. Cl.
CPC ......... *H01R 13/5213* (2013.01); *H02J 7/0044* (2013.01)

(58) Field of Classification Search
USPC .......................................... 320/115; 439/521
See application file for complete search history.

(56) References Cited

U.S. PATENT DOCUMENTS

| 8,142,228 B1* | 3/2012 | Wu | H01R 27/02 439/628 |
|---|---|---|---|
| 2007/0182367 A1* | 8/2007 | Partovi | H01F 5/003 320/108 |
| 2013/0181661 A1* | 7/2013 | Workman | H02J 7/0042 320/107 |
| 2013/0309901 A1* | 11/2013 | Hilbourne | H01R 13/516 439/502 |

* cited by examiner

*Primary Examiner* — Richard Isla Rodas
*Assistant Examiner* — David V Henze-Gongola
(74) *Attorney, Agent, or Firm* — Garcia-Zamor IP Law; Ruy M. Garcia-Zamor

(57) ABSTRACT

A dustproof cover of the disclosure is inserted into a charging port of an electronic device to prevent dust entering into the charging port. The charging port includes a pair of charging terminals. The dustproof cover includes a plug, a cover body fixed with one end of the plug, a plurality of metal connecting posts, and a conductive part located between the plug and the cover body. A first end of each metal connecting post extends into the plug, and a second end of each metal connecting post is electrically connected to the conductive part. In use, the plug is inserted into the charging port, the plurality of metal connecting posts contact the charging terminals, the conductive part is electrically connected to the charging terminals, and the cover body covers the charging port. The present disclosure also discloses a charging base corresponding to the dustproof cover.

5 Claims, 6 Drawing Sheets

DUSTPROOF COVER FOR CHARGING PORT OF ELECTRONIC DEVICE AND CHARGING BASE CORRESPONDING TO DUSTPROOF COVER

TECHNICAL FIELD

The present disclosure generally relates to electronic devices, and especially to a dustproof cover for a charging port of an electronic device.

DESCRIPTION OF RELATED ART

Nowadays, most of electronic devices, such as mobile phones, panel computers generally include charging ports for battery charging. In order to insert the plug of the charging wire to the charging port conveniently, the charging ports of the electronic devices are generally employed open-type structures and are exposed out of the exterior surfaces of the electronic devices, which results that it is easy for dust and dirt to intrude into the charging ports to influence the performance of the charging ports.

In the prior arts, a dustproof cover is generally employed to insert into the charging ports of the electronic devices to prevent the dust and dirt intruding into the charging ports. However, when the electronic devices require battery charging, consumers are required to pull out the dustproof cover from the electronic devices, and when the battery charging is finished, the consumers are required to insert the dustproof cover back into the charging ports of the electronic devices, which results inconvenience for the consumers.

Therefore, a need exists in the industry to overcome the described problems.

SUMMARY

The disclosure is to offer a dustproof cover inserted into a charging port of an electronic device. The dustproof cover of the disclosure not only prevents dust and dirt intruding into the charging port of the electronic device, but also offers convenience to consumers, because the electronic device carries out battery charging without requirement for the consumers to pull out the dustproof cover from the electronic device.

A dustproof cover of the disclosure is inserted into a charging port of an electronic device to prevent dust and dirt entering into the charging port. The charging port includes a pair of charging terminals. The dustproof cover includes a plug, a cover body fixed with one end of the plug, a plurality of metal connecting posts, and a conductive part located between the plug and the cover body. A first end of each of the plurality of metal connecting posts extends into the plug, and a second end of each of the plurality of metal connecting posts is electrically connected to the conductive part. In use, the plug is inserted into the charging port, the plurality of metal connecting posts contact the charging terminals, the conductive part is electrically connected to the charging terminals, and the cover body covers the charging port.

Preferably, the dustproof cover further includes a printed circuit board (PCB) located between the plug and the cover body. The plug includes a pair of positioning portions located at one end of the plug, and a positioning slot is defined between the pair of the positioning portions. The PCB is positioned in the positioning slot, the second end of each of the plurality of metal connection posts is inserted into the PCB, and is electrically connected to the PCB. The conductive part includes a pair of conductive posts located between one of the positioning portions of the plug and the cover body and electrically connected to the PCB, and one end of each conductive post is exposed out of the cover body.

Preferably, each positioning portion defines a positioning hole. Each conductive post includes a connecting portion, a positioning post, and a conductive contact. The positioning post and the conductive contact respectively extend from two sides of the connecting portion. The positioning post is inserted into the positioning hole of a corresponding positioning portion of the plug, and the connecting portion contacts the PCB and is electrically connected to the PCB. The conductive contact is exposed out of the cover body and fixed with the cover body.

Preferably, the cover body defines a recess on one side of the cover body adjacent to the plug. The cover body defines a pair of through holes communicating with the recess, and the cover body includes a pair of opposite projections located in the recess. The pair of positioning portions of the plug are received in the recess with the PCB stopped between the pair of projections and the conductive contacts of the pair of conductive posts respectively extending into the pair of through holes of the cover body.

Preferably, each metal connecting post is a pin made of copper.

Preferably, the cover body is in a shape of a tetragonum.

Preferably, the electronic device includes a wireless charging module located inside the electronic device. The conductive part includes a flexible circuit board. One end of the flexible circuit board is fixed between the plug and the cover body, and is electrically connected to the metal connecting posts, another end of the flexible circuit board is electrically connected to the wireless charging module.

A charging base of the disclosure corresponding to the dustproof cover defines a receiving slot and includes a pair of metal charging posts.

Preferably, the receiving slot is in a shape of a tetragonum.

Preferably, the charging base further includes a stopping block and a stopping board respectively located at two sides of the receiving slot.

It follows that, the dustproof cover of the disclosure transfers the conductive terminals in the charging port of the electronic device to the conductive part of the dustproof cover. When the electronic device requires battery charging, the consumers are not required to pull out the dustproof cover from the electronic device, which results convenience to the consumers.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
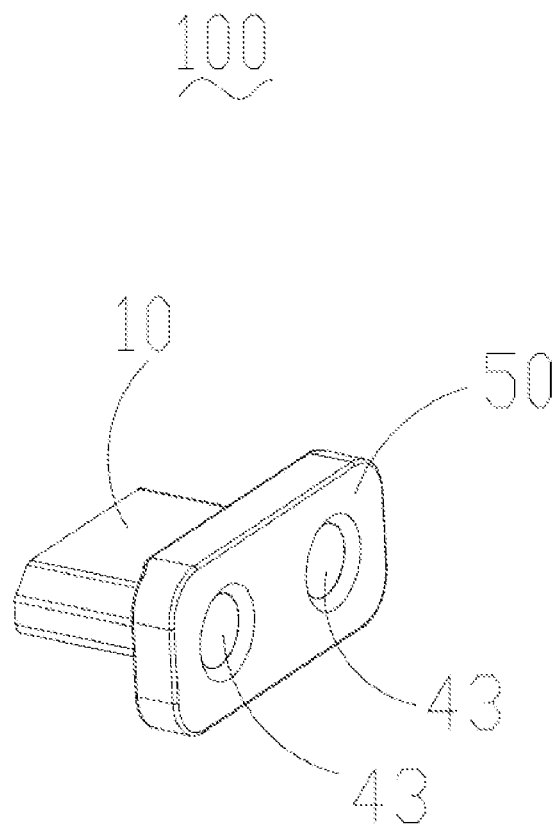
FIG. 1 is an assembled view of a dustproof cover inserted into a charging port of an electronic device of an exemplary embodiment of the disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
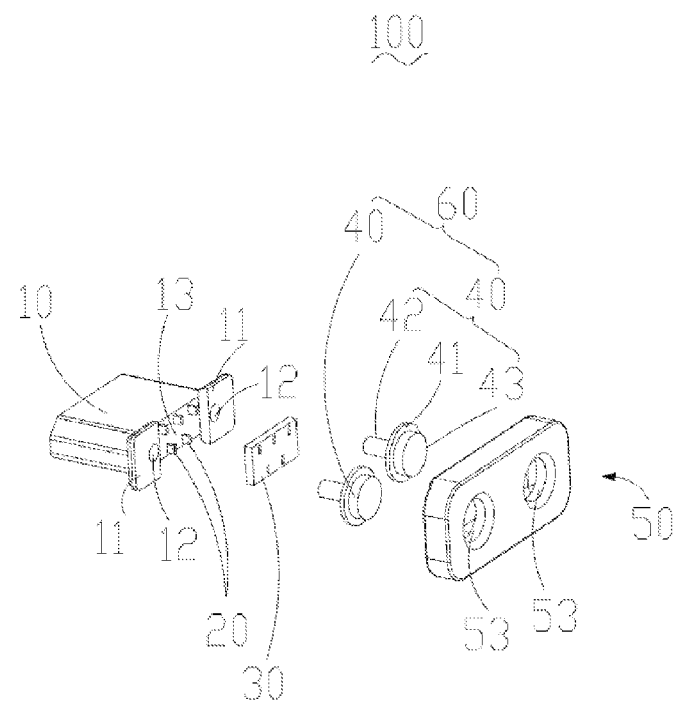
FIG. 2 is a disassembled view of FIG. 1.
Figure 3:
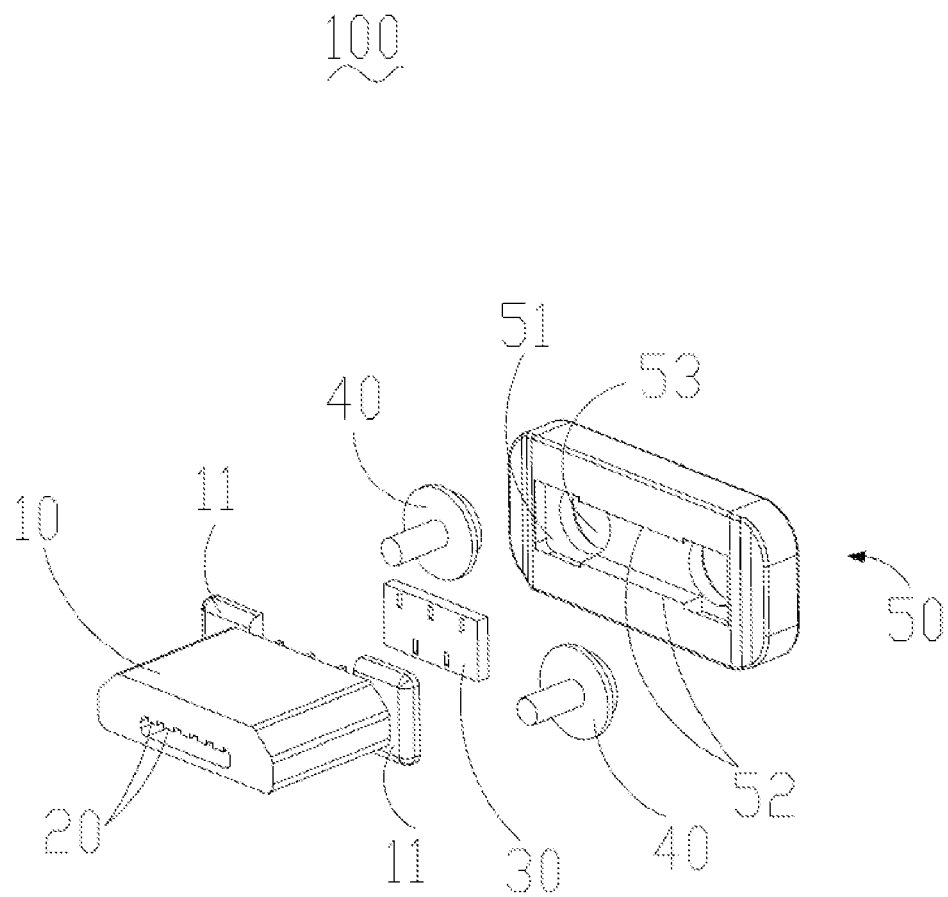
FIG. 3 is same as FIG. 1, but viewed from another view.

With reference to FIGS. 1-3, a dustproof cover 100 of the disclosure is inserted into a charging port of an electronic device (not shown) to prevent dust and dirt intruding into the charging port of the electronic device. The charging port of the electronic device includes a pair of charging terminals. The charging terminals are configured for battery charging for the electronic device.

The dustproof cover 100 includes a plug 10, a plurality of metal connecting posts 20, a conductive part 60 and a cover body 50. A first end of each metal connecting post 20 extends into the plug 10, and a second end of each metal connecting post 20 electrically connects to the conductive part 60. The conductive part 60 is located between the plug 10 and the cover body 50. The cover body 50 is fixed with the plug 10.

In use, the plug 10 is inserted into the charging port of the electronic device. The metal connecting posts 20 contact the charging terminals in the charging port. As a result, the conductive part 60 is electrically connected to the charging terminals of the electronic device. The cover body 50 covers the charging port to prevent dust and dirt intruding into the charging port of the electronic device.

In other words, the charging terminals in the charging port of the electronic device is transferred to the conductive part 60 of the dustproof cover 100 via the metal connecting posts 20 of the dustproof cover 100. When the electronic device is required battery charging, the dustproof cover 100 is not required to pull out from the charging port of the electronic device, which results convenience for consumers.

In the embodiment, the plug 10 includes a pair of positioning portions 11. A positioning slot 13 is defined between the pair of positioning portions 11. The second end of each metal connecting post 20 is exposed out of the positioning slot 13. The dustproof cover 100 further includes a printed circuit board (PCB) 30 positioned in the positioning slot 13. In assembly, the second end of each metal connecting post 20 is inserted into the PCB 30, and is electrically connected to the PCB 30. The conductive part 60 includes a pair of conductive posts 40 electrically connected to the PCB 30. In assembly, each conductive post 40 is positioned between a corresponding positioning portion 11 of the plug 10 and the cover body 50, and one end of each conductive post 40 is exposed out of the cover body 50.

Further, each positioning portion 11 defines a positioning hole 12. Each conductive post 40 includes a connecting portion 41, a positioning post 42 and a conductive contact 43. The positioning post 42 and the conductive contact 43 respectively extend from two sides of the connecting portion 41. In assembly, the positioning post 42 of each conductive post 40 is inserted into a corresponding positioning hole 12 of the plug 10. The connecting portion 41 contacts the PCB 30, and is electrically connected to the PCB 30. The conductive contact 43 is exposed out of the cover body 50.

In the embodiment, the cover body 50 defines a recess 51 on one side of the cover body 50 adjacent to the plug 10. The cover body 50 includes a pair of opposite projections 52 located in the recess 51. The cover body 50 defines a pair of through holes 53 communicating with the recess 51, as shown in FIG. 3. In assembly, the positioning portions 11 of the plug 10 are received in the recess 51. The PCB 30 is stopped between the pair of projections 52. The conductive contacts 43 respectively extend into the through holes 53 of the cover body 50, and are exposed out of the cover body 50.

Figure 4:
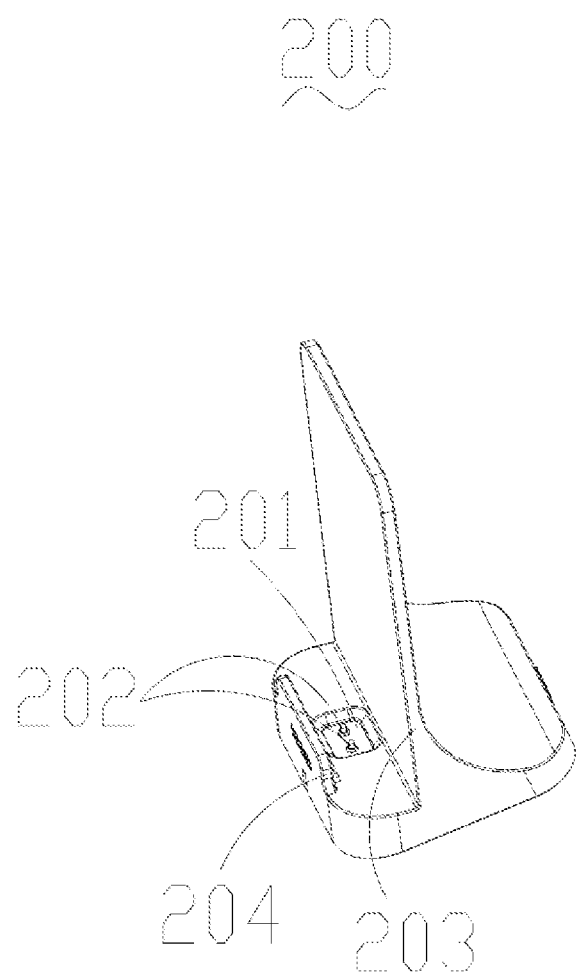
FIG. 4 is an assembled view of a charging base of an exemplary embodiment of the disclosure.

FIG. 4 is a perspective view of a charging base 200 according to an exemplary embodiment of the disclosure. The charging base 200 corresponds to the dustproof cover 100 of the disclosure. The charging base 200 defines a receiving slot 201, and includes a pair of metal charging posts 202 projecting from a bottom of the receiving slot 201.

That is, in the embodiment, the charging terminals of the electronic device are transferred into an exterior surface of the cover body 50 of the dustproof cover 100. When the electronic device requires battery charging, the cover body 50 of the dustproof cover 100 is received in the receiving slot 201 of the charging base 200, ends of the conductive posts 40 exposed out of the cover body 50 of the dustproof cover 100 contact the metal charging posts 202 of the charging base 200, respectively. As a result, when the electronic device requires battery charging, the consumers are not required to pull out of the dustproof cover 100 from the electronic device.

In the embodiment, the charging base 200 includes a stopping board 203 and a stopping block 204 respectively located at two sides of the receiving slot 201. When the electronic device is positioned on the charging base 200 for battery charging, the stopping board 203 and the stopping block 204 are configured for preventing the electronic device tilting, which ensures the conductive contacts 43 of the dustproof cover 100 to contact the metal charging posts 202 of the charging base 200 firmly.

In the embodiment, each metal connecting post 20 is a pin made of copper, and is stabbed into the plug 10 in high speed.

In the embodiment, the cover body 50 of the dustproof cover 100 is in a shape of a tetragonal. Correspondingly, the receiving slot 201 of the charging base 100 is in a shape of a tetragonal.

Figure 5:
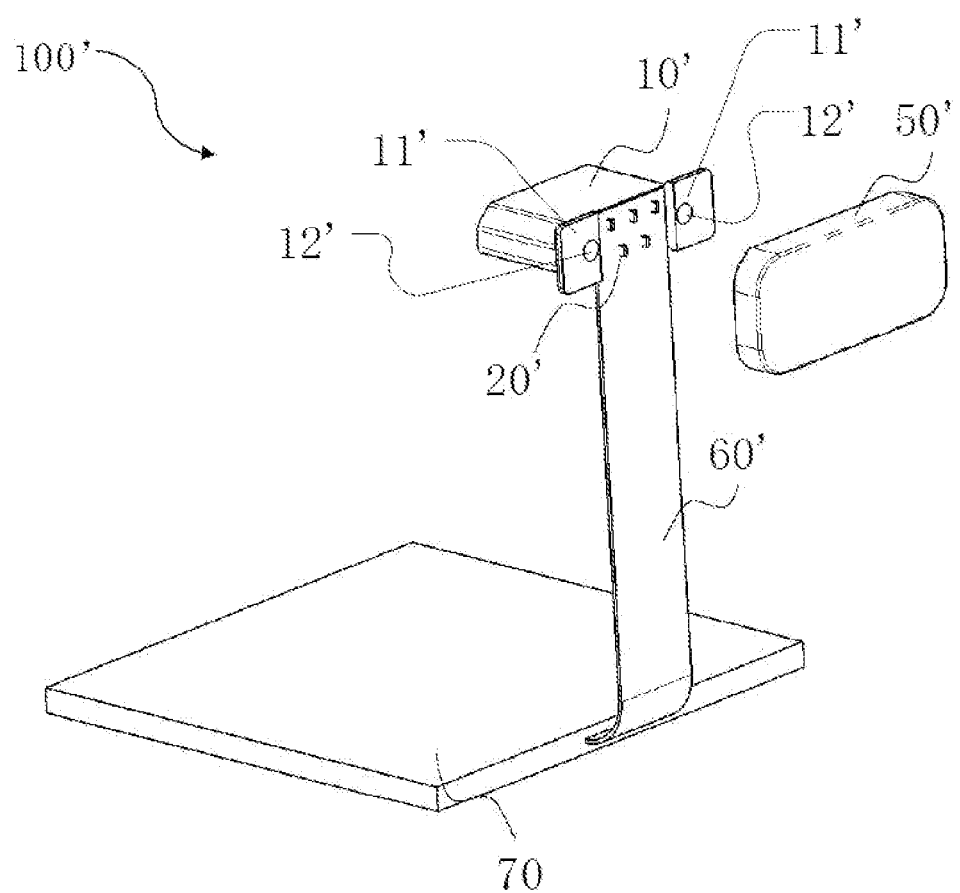
FIG. 5 is a disassembled view of the dustproof cover according to another exemplary embodiment of the disclosure.

FIG. 5 is a disassembled view of a dustproof cover 100' according to another embodiment of the disclosure. The structure of the dustproof cover 100' is substantially similar with that of the dustproof cover 100. The difference between the dustproof cover 100' and the dustproof cover 100 is that a conductive part 60' of the dustproof cover 100' is a flexible circuit board. In the embodiment, the electronic device includes a wireless charging module 70. One end of the flexible circuit board is fixed between a cover body 50' and a plug 10' of the dustproof cover 100', and is electrically connected with metal connecting posts 20'. Another end of the flexible circuit board is electrically connected to the wireless charging module 70.

Figure 6:
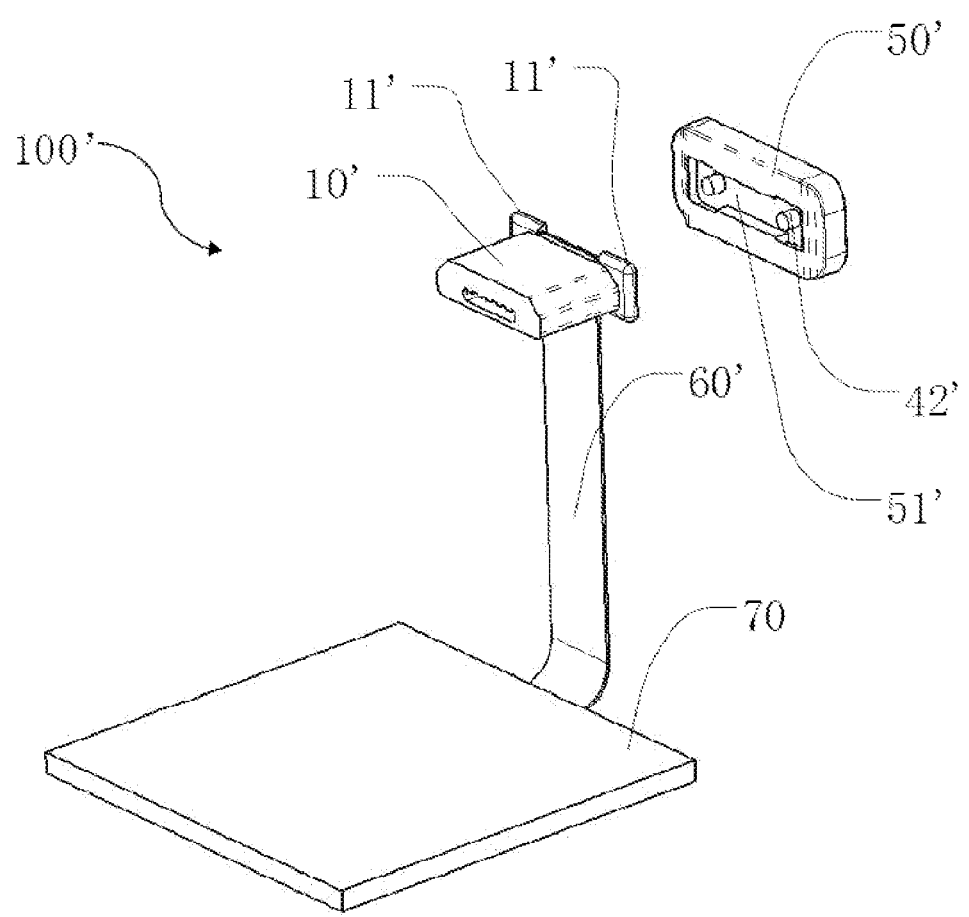
FIG. 6 is same as FIG. 5, but viewed from another view.

With reference to FIG. 6, in the embodiment, the cover body 50' of the dustproof cover 100' includes a pair of positioning posts 42' located in a recess 51' of the cover body 50'. In assembly, positioning portions 11' of the plug 10' are positioned in the recess 51' of the cover body 50'. The positioning posts 42' insert into positioning holes 12' of the positioning portions 11' to secure the cover body 50' on the plug 10', which results that, the other end of the flexible circuit board are fixed between the plug 10' and the cover body 50'.

In other words, in the embodiment, the charging terminals in the charging port of the electronic device are transferred to the wireless charging module 70 of the electronic device via the flexible circuit board of the dustproof cover 100'. When the electronic device requires battery charging, the electronic device is carried out wireless battery charging, and the consumers are not required to pull out the dustproof cover 100' from the electronic device, which results convenience for the consumers.

It follows that, the dustproof covers 100, 100' of the disclosure transfer the charging terminals in the charging port of the electronic device to the conductive parts 60, 60' of the dustproof covers 100, 100'. The dustproof covers 100, 100' are inserted into the charging port of the electronic device to prevent the dust and dirt intruding into the charging port. In addition, when the electronic device requires battery charging, the consumers are not required to pull out of the dustproof covers 100, 100' from the electronic device, which results convenience for the consumer.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A dustproof cover inserted into a charging port of an electronic device to prevent dust entering into the charging port, the charging port comprising a pair of charging terminals, the dustproof cover comprising:
   a plug;
   a cover body fixed with one end of the plug;
   a plurality of metal connecting posts, a first end of each of the plurality of metal connecting posts extending into the plug; and
   a conductive part located between the plug and the cover body, and wherein a second end of each of the plurality of metal connecting posts is electrically connected to the conductive part;
   wherein the plug is inserted into the charging port, the plurality of metal connecting posts contact the charging terminals, the conductive part is electrically connected to the charging terminals, and the cover body covers the charging port; and
   a printed circuit board (PCB) located between the plug and the cover body, wherein the plug comprises a pair of positioning portions located at one end of the plug, a positioning slot is defined between the pair of the positioning portions, wherein the PCB is positioned in the positioning slot, the second end of each of the plurality of metal connection posts is inserted into the PCB, and is electrically connected to the PCB, and wherein the conductive part comprises a pair of conductive posts located between one of the positioning portions of the plug and the cover body and electrically connected to the PCB, and one end of each conductive post is exposed out of the cover body, wherein each positioning portion defines a positioning hole, each conductive post comprises a connecting portion, a positioning post, and a conductive contact, the positioning post and the conductive contact respectively extend from two sides of the connecting portion, and wherein the positioning post is inserted into the positioning hole of a corresponding positioning portion of the plug, and the connecting portion contacts the PCB and is electrically connected to the PCB, and wherein the conductive contact is exposed out of the cover body and fixed with the cover body, an extending direction of the positioning hole being parallel with the metal connecting posts.

2. The dustproof cover of claim 1, wherein the cover body defines a recess on one side of the cover body adjacent to the plug, the cover body defines a pair of through holes communicating with the recess, and the cover body comprises a pair of opposite projections located in the recess, and wherein the pair of positioning portions of the plug are received in the recess with the PCB stopped between the pair of projections and the conductive contacts of the pair of conductive posts respectively extending into the pair of through holes of the cover body, the pair positioning portions of the plug directly contacting with the PCB.

3. The dustproof cover of claim 1, wherein each metal connecting post is a pin made of copper.

4. The dustproof cover of claim 1, wherein the cover body is in a shape of a tetragonum.

5. The dustproof cover of claim 1, wherein the electronic device comprises a wireless charging module located inside the electronic device, and the conductive part comprises a flexible circuit board, and wherein one end of the flexible circuit board is fixed between the plug and the cover body, and is electrically connected to the metal connecting posts, another end of the flexible circuit board is electrically connected to the wireless charging module.

* * * * *